J. C. OWENS.
MUFFLER VALVE BALL COCK.
APPLICATION FILED MAR. 20, 1919.

1,313,831. Patented Aug. 19, 1919.

Inventor
Jesse C. Owens
by Nestall and Wallace
his Attorneys

UNITED STATES PATENT OFFICE.

JESSE C. OWENS, OF LOS ANGELES, CALIFORNIA.

MUFFLER-VALVE BALL-COCK.

1,313,831.

Specification of Letters Patent.   Patented Aug. 19, 1919.

Application filed March 20, 1919.  Serial No. 283,825.

*To all whom it may concern:*

Be it known that I, JESSE C. OWENS, a citizen of the United States, residing at Los Angeles, in the county of Los Angeles and State of California, have invented new and useful Improvements in Muffler-Valve Ball-Cocks, of which the following is a specification.

This invention relates to improvements in closet tanks and pertains particularly to ball cock mechanism for controlling the supply of water to the tank.

The principal object of this invention is to provide a ball cock mechanism which has a valve seating easily and without shock, and which is quiet in operation. Another object of this invention is to provide a valve, which seats with the water pressure. A further object of this invention is to provide a valve structure which has means operated by the impact of the flowing water tending to hold the valve open.

Figure 1:
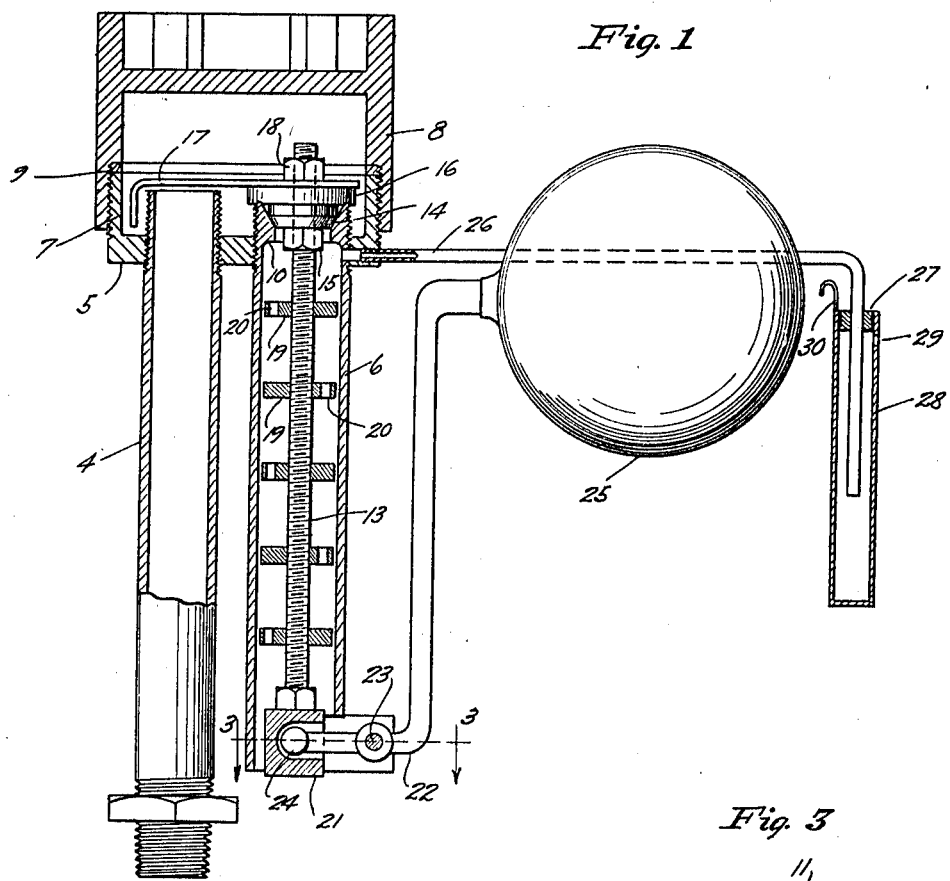
Figure 3:
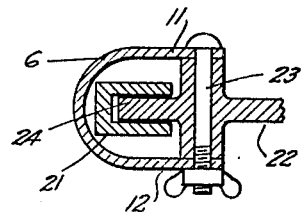
Figure 2:
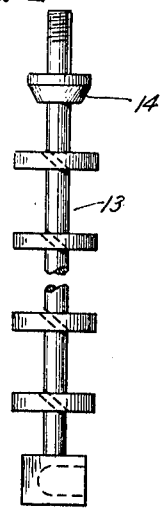

These objects will be more fully understood, as will also other objects and corresponding accomplishments of my invention from the following detailed description of a preferred embodiment thereof. For the purpose of this description reference is had to the accompanying drawing, in which:

Figure 1 is an elevation partly in section of ball cock mechanism with a refill tube; Fig. 2 is an elevation of a modified form of valve rod with baffles thereon; and Fig. 3 is a section taken on the line 3—3 of Fig. 1.

The details and features of my invention will now be more particularly described, reference being had to the drawing. An intake tube for connection to the service pipe is indicated by 4. The intake tube is threaded into a tie plug 5. The plug 5 is provided with a second threaded opening in which is disposed a discharge tube 6. The tie plug has a flange 7, which is externally threaded to receive a cap 8. A washer 9 for packing the joint between the cap and plug is interposed therebetween. The tie plug and cap form a valve compartment.

Discharge tube 6 is formed with a tapered valve seat 10 at the upper end thereof. The lower end is split and straightened to form bracket arms 11 and 12. Extending through the discharge tube 6 is a valve rod 13, which is threaded throughout its length. Mounted upon the upper end of the valve rod is a cone nut 14, whose conical side conforms to the conical portion of the seat 10. A jam nut 15 holds the cone nut in position. Mounted above the cone nut is a washer 16, which seats upon the upper edge of seat 10. Mounted on the rod 13 is a splash plate 17. The latter extends over the intake pipe and when in its lower position almost closes the latter. A jam nut 18 holds the washer 16 and splash plate 17 in position. Mounted upon the valve rod at uniform distances apart are baffles 19 slightly smaller than the inside diameter of tube 6, so that there is a clearance between the baffles and the tube. The baffles are provided with ports 20 for the passage of water, and the baffles with their ports are so arranged that the ports are in staggered relation. In Fig. 1 I have shown a threaded valve rod with washers as baffle plates and a cone nut threaded thereon, while in Fig. 2 I have shown all cast in one piece. Secured to the lower end of valve rod 13 is a socket 21.

A float lever 22 is pivoted upon a pin 23 supported upon the brackets 11 and 12. The float lever has a head 24 disposed in the socket 21 making a connection such that when pin 23 is removed the lever may be detached from the socket on the valve rod. This construction also makes the assembly of the float lever and valve rod easy. The float lever 22 has mounted upon its end the usual ball float 25, which is moved with the rise and fall of the water in the tank.

Tapped into the tie plug 5 and communicating with the discharge tube 6 is a refill tube 26. Refill tube 26 extends through a slip nut 27 threaded into the top of a muffler tube 28. The muffler tube is closed at the bottom and provided with a discharge opening 29 adjacent its top. A supporting hook 30 is attached thereto at the top.

When the tank has been emptied and the buoyant force of the water no longer acts upon the float 25, the latter drops turning the float lever 22 about its pivotal axis thereby raising the valve rod 13. This lifts the valve from its seat 10 against the pressure of the water within the cap 8, permitting a discharge of water through the discharge pipe into the tank. At the same time the splash plate 17 is lifted from the end of intake tube 4. Water from the service pipe passes through intake tube and impinges against splash plate 17 tending to hold the latter in its upper position and thereby tending to hold the discharge valve in open position. Water passes into the cap 8 and then into the discharge tube 6. It passes through the discharge tube around the edges of the baffle plates and more especially through the ports 20, thereby being muffled in its passage through the discharge tube. As the level of the water rises in the tank, the pressure upon the float 25 increases and the pressure upon the discharge valve tending to force it to its seat increases. However, the water continues to strike against the splash plate and counteract the tendency of the valve to close. The valve gradually closes and the splash plate more nearly closes the end of the intake pipe 4, the pressure of the water upon the splash plate decreasing as the latter reaches its lower position.

While the tank is filling, water flows through the refill pipe 26 and into the muffler tube 28 adjacent the bottom thereof, thence upwardly discharging through port 29. The muffler tube 28 serves to decrease the noise of refilling. The amount of water supplied through the refill pipe is equal to that lost by the inertia of the water flowing out of the closet bowl during the flushing operation.

What I claim is:

1. In a ball cock structure, the combination of a closed valve compartment having an intake and a discharge, a valve seating over said discharge, a splash member fixed to said valve and disposed over said intake so that the water flowing into said compartment will impinge on said member, and means to lift said valve from its seat.

2. In a ball cock structure, the combination of a closed valve compartment having an intake and a discharge, a discharge tube communicating with said compartment, a valve in said compartment seating over said discharge tube, a splash member fixed to said valve and disposed over said intake so that water entering will impinge upon said member, a valve rod extending through said discharge tube and secured to said valve, and float means to lift said valve rod.

3. In a ball cock structure, the combination of a closed valve compartment having an intake, a discharge tube connected to said compartment, a valve seating over said discharge tube, a splash member fixed to said valve and disposed over said intake so that water entering said compartment will impinge upon said member, a valve rod extending through said discharge tube and secured to said valve, baffle plates secured to said valve rod, and float means to lift said valve rod.

4. In a ball cock structure, the combination of a closed valve compartment having an intake, a discharge tube connected to said compartment, said tube being provided with a bracket at its lower end, a valve seating over said discharge pipe, a splash member fixed to said valve and disposed over said intake so that water entering said compartment will impinge upon said member, a valve rod disposed within said discharge tube and secured to said valve, a float lever pivotally secured to said bracket and to said valve rod.

5. In a ball cock structure, the combination of a closed valve compartment having an intake, a discharge tube connected to said compartment, said discharge tube being provided with a bracket at its lower end, a valve seating over said discharge tube within said compartment, a splash plate fixed to said valve and disposed over said intake so that water entering therein will impinge upon said plate, a valve rod mounted within said discharge tube and secured to said valve, baffle plates mounted upon said valve rod, and a float lever pivotally secured to said bracket and to said valve rod for lifting the latter.

In witness that I claim the foregoing I have hereunto subscribed my name this 12th day of March, 1919.

JESSE C. OWENS.

Copies of this patent may be obtained for five cents each, by addressing the "Commissioner of Patents, Washington, D. C."